United States Patent [19]

Sordello et al.

[11] 3,801,969

[45] Apr. 2, 1974

[54] ERASE FEATURE FOR DATA RECORDING DEVICE

[75] Inventors: Frank J. Sordello, San Jose; Kent A. Salmond, Los Gatos, both of Calif.

[73] Assignee: Itel Corporation, San Francisco, Calif.

[22] Filed: July 24, 1972

[21] Appl. No.: 274,339

[52] U.S. Cl. .............................................360/39

[51] Int. Cl.......................... G11b 5/02, G11b 19/02

[58] Field of Search... 340/172.5, 174.1 R, 174.1 G; 179/100.2 D

[56] References Cited

UNITED STATES PATENTS

| | | | |
|---|---|---|---|
| 2,756,278 | 7/1956 | Goshaw | 179/100.2 D |
| 2,766,328 | 10/1956 | Handschin et al. | 179/100.2 D |
| 2,816,176 | 12/1957 | Taris et al. | 179/100.2 D |
| 2,862,199 | 11/1958 | Scott | 340/174.1 G |
| 3,290,654 | 12/1966 | Rettig et al. | 340/174.1 R X |
| 3,337,852 | 8/1967 | Lee et al. | 340/172.5 |
| 3,649,752 | 3/1972 | Kinjo | 179/100.2 D X |
| 3,711,844 | 1/1973 | Irwin | 340/174.1 B |

*Primary Examiner*—Paul J. Henon
*Assistant Examiner*—Paul R. Woods
*Attorney, Agent, or Firm*—Moore, Zimmerman & Dubb

[57] ABSTRACT

This invention relates to a method of recording data and more specifically to apparatus for recording data wherein a control unit is utilized to regulate a data recording device and the data recording device is provided with means for accomplishing independently certain of the writing tasks in a manner to free the controller for other tasks.

7 Claims, 1 Drawing Figure

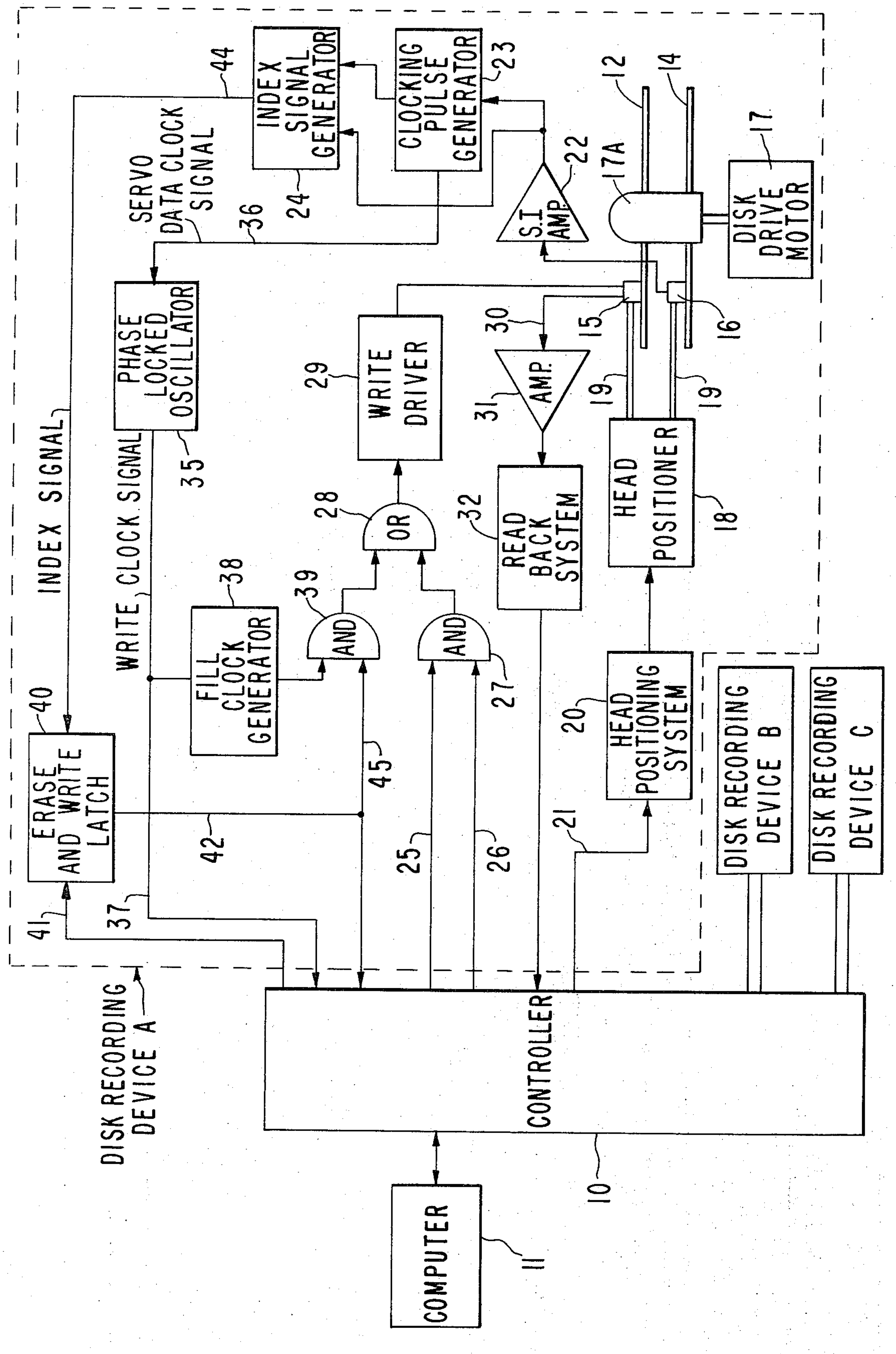
INDEX SIGNAL GENERATOR
CLOCKING PULSE GENERATOR
SERVO DATA CLOCK SIGNAL
S.I. AMP.
DISK DRIVE MOTOR
PHASE LOCKED OSCILLATOR
WRITE DRIVER
AMP.
INDEX SIGNAL
WRITE CLOCK SIGNAL
OR
READ BACK SYSTEM
HEAD POSITIONER
FILL CLOCK GENERATOR
AND
AND
ERASE AND WRITE LATCH
HEAD POSITIONING SYSTEM
DISK RECORDING DEVICE B
DISK RECORDING DEVICE C
DISK RECORDING DEVICE A
CONTROLLER
COMPUTER
10
11
12
14
15
16
17
17A
18
19
19
20
21
22
23
24
25
26
27
28
29
30
31
32
35
36
37
38
39
40
41
42
44
45

ERASE FEATURE FOR DATA RECORDING DEVICE

BACKGROUND OF THE INVENTION

In a normal computer installation, there usually exists several types of data recording devices with each type being regulated by one or more controllers situated to communicate with the computer. One example of a normal operation involves a request from the computer for data from the controller and the controller reading data from one media location, transmitting the data to the computer, receiving back the updated for recording at another media location. Recording at another media location usually is necessary since the data set may be of a different length that it was when read into the computer, thereby making it impractical or impossible to record in the same location.

To explain such an operation more specifically, a data recording system utilizing a disc recording device is used as the example. The recording on a disc surface is accomplished in concentric circular locations or tracks and usually requires that the data be read from the one track by moving the head to that location and awaiting the rotation of the disc until the data to be read is identified and transferred into the controller. After transmission to the computer and back to the controller, the data is fed to a different recording head positioned at a new location usually immediately following other data that has been recently recorded.

The new data will begin immediately after the last data recorded in the track. The recording is accomplished, even though outdated data may have been recorded at that location previously. Since the new data probably will not fill the complete location which has a distinct length, erasure of the remainder of that location must be accomplished by recording a series of ones or zeroes after the end of data signal to preclude the presence of nonapplicable data. A typical controller of the type used with disc recording devices is disclosed in U.S. Pat. No. 3,299,411, Variable Gap Filing System, issued on Jan. 17, 1967.

In the past, such recording for erasing purposes has required that the control unit be occupied for the total length of time data is being recorded and the remainder of the time the data location is being traversed for erasure. It is the primary object of the subject invention to greatly enhance the effectiveness and efficiency of such a data recording system by making a significant improvement which permits the release of the controller during substantial periods of operation of the recording device.

SUMMARY OF THE INVENTION

In a data recording system wherein data is recorded on a media by one of a plurality of data recording devices under control of a control unit, there is provided means for recording data on the media at precise data locations in response to signals received from the control unit, means for signaling the end of the data signal and means for disconnecting the control unit from the data recording device in response to the end of data signal and causing said data recording device to erase the remainder of the media location.

BRIEF DESCRIPTION OF THE DRAWINGS

FIG. 1 is a schematic and block diagram of one embodiment of the subject invention.

DESCRIPTION OF THE PREFERRED EMBODIMENT

Shown in FIG. 1 is a data recording system comprising disc recording devices A, B and C connected through the normal communications lines to a controller 10 which in turn connects with a computer 11. Each device comprises a disc drive in which information is stored magnetically on the surface of discs 12 and 14 by means of magnetic read/write heads 15 and 16. The discs are rotated by a disc drive motor 17. A head positioner 18 connected to the heads through support arms 19 serves to move the heads towards and away from the hub 17A for recording and reading data positioned at concentric circular locations or tracks on the disc surfaces. The head positioner is controlled by the head positioning system 20 acting in response to signals received by the control unit through the conductor 21.

In one embodiment of such a disc drive system, servo signals are recorded, for instance on the surface of disc 14, and detected by head 16 to enable precise positioning of the head 15 at the concentric circular locations on the disc surface. Since the heads are moved in unison by the head positioner, detection of the head positioning signals by means of the circuit including a servo information amplifier 22, a clocking pulse generator 23 and an index signal generator 24 allows the positioning of the heads at the required data locations on the disc. The clocking pulse generator and the index signal generator generate the clocking and index signals, respectively, in response to the servo signal read from the disc 14 in a manner well known to this technology.

In the normal operation of recording data on the surface of the disc 12, the head is positioned at a desired location and a signal is sent by the controller 10 through conducter 25 indicating that the writing operation is desired. Thereafter, the receipt of the write signal through the conductor 26 energizes the And gate 27 for passage of the signal through the Or gate 28 to the write driver 29 for transmission to the recording head 15. For reading information, signals are detected by the head 15 and conducted through the conductor 30, the amplifier 31 and the readback system 32 for passage to the control unit. In this manner, data is written on and read from the disc 12 by means of the system described. For further description of such a typical disc drive system, reference can be had to U. S. Pat. No. 3,503,060, Goddard, et al., entitled *Direct Access Magnetic Disc Storage Device* and issued on Mar. 24, 1970.

As pointed out previously, the data is recorded on concentric tracks on the disc surfaces. Naturally, all of the tracks and all of the data sets to be recorded may not be of equal length. Therefore, when data is to be recorded, there usually remains a space after the end of the data set at each location which must be erased to make certain that previously recorded but nonapplicable data does not remain which might later be read and interpreted as updated data. For this purpose, it is normal practice to record a predetermined signal such as a series of "ones" or "zeros" after the end of the data set and for the remainder of the track to effect the erasure of any previously recorded data. In such previous devices, the controller has been used for this erasing function so as to render it unavailable for achieving other tasks. For an example of the recording operation of such a controller, please see U.S. Pat. No. 3,299,411 previously identified herein. It is the purpose of this invention to greatly improve the efficiency of a data recording device such as a disc or tape recording system by releasing the controller for other duties during the erasing function in the manner described hereinafter.

In accordance with the present invention, there is provided a data recording system such as that described heretofore having means for recording and reading data at specific media locations, means for detecting when an end-of-data set is reached during recording and means for energizing the recording device to record independently of the controller a series of predetermined signals, thereby erasing the remainder of the data track location while freeing the controller for other duties.

For purposes of the invention there is provided within the recording device itself a standard phase locked oscillator 35 which receives through a conductor 36 the servo data clock signal from the clocking pulse generator 23 and functions to generate a clocking signal which is responsive to the servo signal detected by the reading head 16. This clocking signal is fed through the conductor 37 back to the controller to serve as a timing signal for the data recording system in the normal manner and also is fed to a fill clock generator 38 which accomplishes the writing of a predetermined signal (such as a series of "ones" or "zeros") responsive to the clocking signal received from the phase locked oscillator. The output signal from the fill clock generator is fed through an And gate 39 to the Or gate 28. Upon proper energization of the fill clock generator, a series of "ones" and "zeros" responsive to the clocking signal are transmitted through the write driver 29 to the read/write head 15 for recording on the recording disc.

Thus, as explained before, during the recording operation, the controller signals through the conductor 25 that a recording of data is to take place. Thereafter, data is transmitted through a conductor 26 thereby energizing the And gate 27 for passage of the data signal through the Or gate 28, the write driver 29 and the read/write head 15 for recording on the proper disc. When the data recording is completed an end-of-data signal is transmitted by the controller. In response to receipt of that signal through a conductor 41, an erase and write latch 40 is energized which in turn, through a conductor 42, energizes the And gate 39. With energization of the And gate, the fill clock generator signal is passed through the Or gate 28 and the write driver 29 for recording on the data disc by means of the read/write head 15. Such recording continues until an index signal is received through a conductor 44 indicating that the end-of-data track is reached. At that point, the latch 40 is turned off, thereby turning off the And gate 39 and ending the conduction of the erasing signal to the writing head.

In the meantime, there has been fed through a conductor 45 a busy signal to the control unit indicating that the erasing function is being carried out. The controller thus is told that the recording device A is busy and not available for other duties as long as the device is being occupied by the erasing function. The controller receives busy signals at other times also, for instance during the period a drive is seeking an address requested. As a result, the controller is freed for other tasks until such time as the busy signal ceases to be transmitted through the conductor 45 at which time the recording device is again ready for normal read or write operations.

Thus, it can be seen that the recording device frees the control unit during a substantial portion of the recording time, such that the control unit can communicate with other recording devices for operations not connected with the present task being performed by the recording device A. This increased time availability can in many instances, double the operations a single controller can perform in a given time. In this manner and because of a high occurrance of this type of operation, the total data processing system's "through-put" can be significantly increased.

We claim:

1. In a data recording system wherein data is recorded on a media in a device under regulation of a controller capable of transmitting data to be recorded on the media by the device and capable also of transmitting an end-of-data signal for initiating other recording or reading tasks and for addressing only those devices ready for receiving instructions, said device including:

writing means for recording data at locations on the media in response to signals received from the controller, such locations having a distinct length whereby after recording of the data the remainder of the location must be erased to prevent the presence of non-applicable data in the location, means receiving the end of data signal for detecting and signalling the occurrence of the end of the data being recorded, erasing means energized in response to the signalling of the end of data by the detecting means for erasing the remainder of the data location, and, means acting in response to energization of the erasing means for signalling the controller the device is erasing the location remainder while such erasing is being accomplished.

2. A data recording system as defined in claim 1 wherein said device is a disk recording device and said media is a recording disk.

3. A data recording system as defined in claim 2 including an index signal generator for signalling the end of a data location.

4. A data recording system as defined in claim 3 wherein said means for erasing is a recording means for recording a series of "ones" or "zeros" on the media.

5. In a data recording system wherein data is recorded on a media in a device under regulation of a controller capable of transmitting data to be recorded on media by a plurality of devices and also capable of receiving and transmitting an end-of-data signal for initiating another recording or reading of data with a selected one of such devices ready to accomplish such tasks, said device including:

a recording head capable of receiving and recording data at predetermined locations on the media, means connected to the recording head to position said head at desired positions relative to the media, means in communication with the controller and recording head and adapted to receive data from the controller and transmit said data to the recording head, said data being followed by the end-of-data signal, a signal generator for generating a predetermined signal, transmitting means in communication with the signal generator and controller and energizeable to transmit said predetermined signal from the signal generator to the recording head for recording on the media in response to receipt of the end-of-data signal from the controller, and means adapted to detect the end of the predetermined location on the media and connected to de-energize the transmitting means for ceasing transmission of the predetermined signal to the media at the end of the predetermined location.

6. In a data recording system as defined in claim 5, said device including means to signal the controller while the means to transmit the predetermined signal is energized.

7. In a data recording system as defined in claim 6, said device including means to signal the controller when the end of the predefined location is detected.

* * * * *